United States Patent
Kang et al.

(10) Patent No.: US 9,758,677 B2
(45) Date of Patent: Sep. 12, 2017

(54) PLATE-LIKE ALUMINUM OXIDE AND PREPARATION METHOD THEREFOR

(71) Applicant: CQV CO., LTD., Jincheon-gun, Chungcheongbuk-do (KR)

(72) Inventors: Kwang-Choong Kang, Cheongju-si (KR); Kyung-Don Nam, Jincheon-gun (KR); Yong-Ho Son, Cheongju-si (KR); Myung-Ho Jung, Jincheon-gun (KR); Byung-Ki Choi, Cheongju-si (KR); Kwang-Soo Lim, Jincheon-gun (KR); Kil-Wan Chang, Cheongju-si (KR)

(73) Assignee: CQV CO., LTD., Jincheon-Gun, Chungcheongbuk-Do (KR)

(*) Notice: Subject to any disclaimer, the term of this patent is extended or adjusted under 35 U.S.C. 154(b) by 0 days.

(21) Appl. No.: 15/125,421

(22) PCT Filed: Mar. 17, 2015

(86) PCT No.: PCT/KR2015/002579
§ 371 (c)(1),
(2) Date: Sep. 12, 2016

(87) PCT Pub. No.: WO2015/142035
PCT Pub. Date: Sep. 24, 2015

(65) Prior Publication Data
US 2017/0088712 A1    Mar. 30, 2017

(30) Foreign Application Priority Data
Mar. 17, 2014  (KR) .......................... 10-2014-0030753

(51) Int. Cl.
*C01F 7/02* (2006.01)
*C09C 1/00* (2006.01)
*C09D 17/00* (2006.01)
*C09D 5/36* (2006.01)
*C09C 1/40* (2006.01)

(52) U.S. Cl.
CPC ............ *C09C 1/0078* (2013.01); *C09C 1/407* (2013.01); *C09D 5/36* (2013.01); *C09D 17/006* (2013.01); *C01P 2004/20* (2013.01); *C01P 2004/54* (2013.01); *C01P 2004/61* (2013.01)

(58) Field of Classification Search
CPC ..... C09C 1/0078; C09C 1/407; C09D 17/006; C09D 5/36; C01P 2004/61; C01P 2004/20; C01P 2004/54
See application file for complete search history.

(56) References Cited

U.S. PATENT DOCUMENTS

| | | | | | |
|---|---|---|---|---|---|
| 5,686,366 | A | * | 11/1997 | Koyama | .............. C04B 35/117 501/105 |
| 2011/0064779 | A1 | * | 3/2011 | Gruener | .............. C09C 1/0015 424/401 |
| 2013/0164356 | A1 | * | 6/2013 | Pfaff | ..................... A23G 3/343 424/401 |
| 2014/0322534 | A1 | * | 10/2014 | Suzuki | ................... C09C 1/407 428/402 |

FOREIGN PATENT DOCUMENTS

| | | | |
|---|---|---|---|
| CN | 101146745 A | | 3/2008 |
| CN | 101535419 A | | 9/2009 |
| CN | 101541681 | | 9/2009 |
| CN | 102220038 | | 10/2011 |
| CN | 104129806 A | | 11/2014 |
| JP | 2007-162174 A | * | 6/2007 |
| KR | 10-0619248 B1 | | 9/2006 |
| KR | 10-2007-0010777 A | | 1/2007 |
| KR | 10-2007-0023626 A | | 2/2007 |
| KR | 10-0787191 B1 | | 12/2007 |
| WO | 2006/101306 A1 | | 9/2006 |
| WO | WO2006/101306 A1 | * | 9/2006 |
| WO | 2008/026829 A1 | | 3/2008 |
| WO | WO2015/176796 A1 | * | 11/2015 |

OTHER PUBLICATIONS

Machine Translation of Korean Patent Specification No. KR 20070010777 (Jan. 2007).*
Priority document EP14001769.0 for WO 2015/176796 A1 (May 2014).*
International Search Report dated Apr. 16, 2015 corresponding to International Application PCT/KR2015/002579.
Chinese Office Action dated Mar. 1, 2017 for Chinese Patent Application No. 201580014304.6.
J. Chandradass et al., "Synthesis and characterization of zirconia doped alumina nanopowder by citrate-nitrate process," Materials Science & Engineering A, 2008, p. 360-364.
European Search Report dated Jan. 2, 2017 for European Application No. 15765086.2-1375.
J. Chandradass et al., "Low Temperature Synthesis and Characterization of Zirconia Doped Alumina Nanopowder by Hydrothermal Process", Materials and Manufacturing Processes, Jan. 23, 2008, 138-142, http://dx.doi.org/10.1080/10426910701774544.

* cited by examiner

*Primary Examiner* — Anthony J Green
(74) *Attorney, Agent, or Firm* — Hauptman Ham, LLP

(57) ABSTRACT

The present invention relates to flaky aluminum oxide and a preparation method thereof, and more particularly, to a flaky aluminum oxide which is suitably used as a substrate for a pearlescent pigment or the like, and to a preparation method thereof.

17 Claims, 1 Drawing Sheet

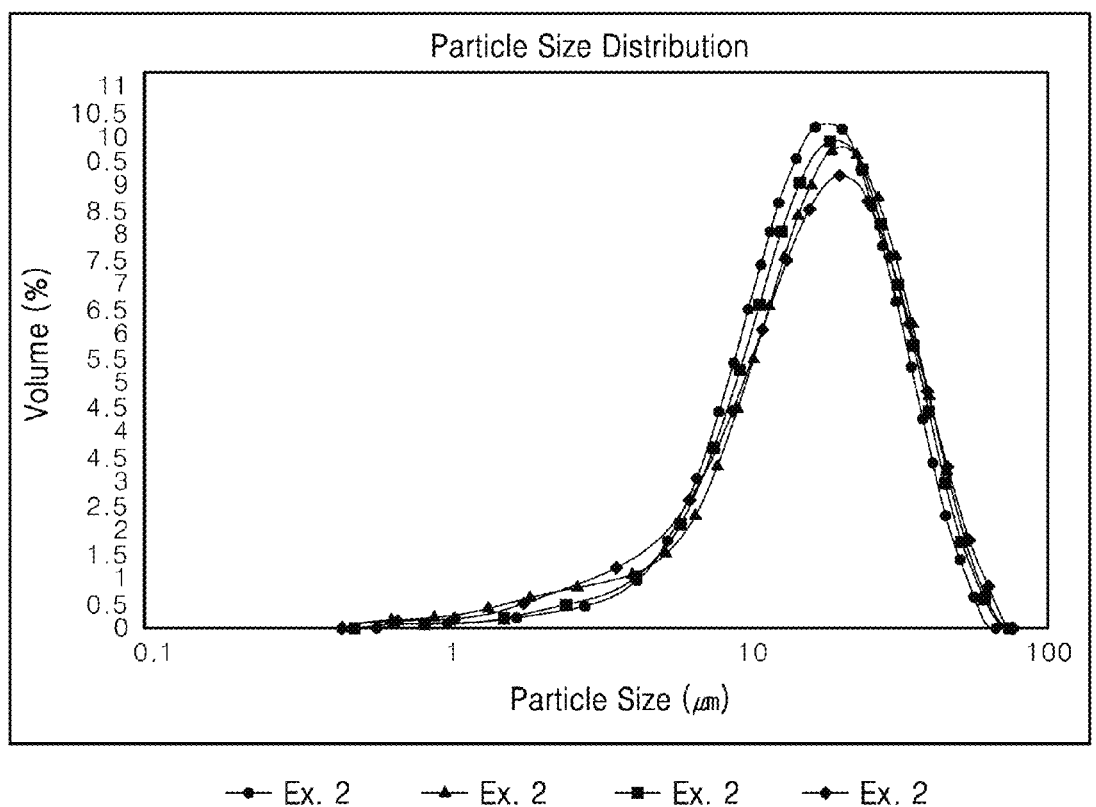

PLATE-LIKE ALUMINUM OXIDE AND PREPARATION METHOD THEREFOR

CROSS REFERENCE TO RELATED APPLICATION

This application claims the priority of Korean Patent Application No. 10-2014-0030753, filed on Mar. 17, 2014 in the KIPO (Korean Intellectual Property Office). Further, this application is the National Phase application of International Application No. PCT/KR2015/002579 filed Mar. 17, 2015, which designates the United States and was published in Korean.

TECHNICAL FIELD

The present invention relates to flaky aluminum oxide and a preparation method thereof, and more particularly, to a flaky aluminum oxide which is suitably used as a substrate for a pearlescent pigment or the like, and to a preparation method thereof.

BACKGROUND ART

In the prior art, a pearlescent pigment prepared by coating a flaky substrate (such as mica flakes) with a metal oxide having a high refractive index was known. As substrates desirable for use in this kind of pigment, synthetic materials having stable quality, such as flaky iron oxide, flaky titanium oxide, and aluminum-doped flaky iron oxide, have been prepared and marketed.

Furthermore, aluminum oxide having high hardness has been used as abrasion-resistant material, ceramic material, coating pigment, abrasive, or the like, and flaky aluminum oxide having improved properties has been prepared.

However, these kinds of aluminum oxide have a problem in that they are not suitable for use as a flaky substrate for pearlescent pigments because of their excessively small particle size small aspect ratio, strong tendency toward crystal twinning and aggregation, and poor dispersion in water. In addition, such aluminum oxide particles are difficult to coat with a metal oxide, because they are poorly dispersible in water and are composed of aluminum oxide alone. Even if coating is possible, the resulting coated particles are not suitable for use as a substrate for pearlescent pigments, because the metal oxide particles have a non-uniform thickness and size and are liable to aggregate. Moreover, the above-mentioned aluminum oxide particles have a disadvantage that they are usually produced by a hydrothermal process which needs an expensive high-pressure reactor.

In addition, studies have been conducted on a method of preparing flaky aluminum oxide using titanium oxide as an additive and a method of preparing flaky aluminum oxide using zinc oxide or tin oxide as an additive.

However, in the method that uses titanium oxide as an additive, the flaky aluminum oxide shows physical properties that are relatively suitable for use as a substrate for pearlescent pigments, but there is a problem in that it is difficult to obtain a flaky alumina crystal having a uniform particle size and excellent dispersibility, because an aging process is not performed after hydrolysis while a calcining process is not performed before crystallization. In addition, in the case in which zinc oxide or tin oxide is used as an additive, zinc oxide or tin oxide, which is present as an oxide, can be recognized as the cause of problems, several companies in highly developed countries restrict the contents of heavy metals in raw materials by the total dissolution method and regulate the use of some raw materials.

DISCLOSURE

Technical Problem

It is an object of the present invention to provide a novel flaky aluminum oxide having excellent properties required for a substrate for a pearlescent pigment and a preparation method thereof.

Technical Solution

To achieve the above object, in accordance with an embodiment of the present invention, there is provided a flaky aluminum oxide comprising aluminum oxide and zirconium oxide as main components.

In accordance with another embodiment of the present invention, there is provided a method for preparing flaky aluminum oxide, comprising the steps of: (1) mixing 100 parts by weight of an aqueous aluminum precursor solution with an aqueous zirconium precursor solution containing, based on 100 parts by weight of the aluminum precursor, 0.01-5 parts by weight of a zirconium precursor, thereby preparing an aqueous metal precursor solution; (2) titrating the aqueous metal precursor solution to a pH of 6.0-7.5 with an aqueous sodium salt solution, followed by hydrolysis, thereby preparing a mixed gel; (3) aging the mixed gel at a temperature of 60 to 100° C. for 5-30 hours, followed by drying to obtain dry powder; (4) calcining the dry powder at a temperature of 300 to 700° C. for 1-5 hours; (5) crystallizing the calcined powder at a temperature of 1,000 to 1,400° C. and 1-7 hours, thereby preparing a crystallized product; and (6) cooling the crystallized product to room temperature, dissolving the cooled product in water at a temperature of 20 to 90° C. to form a product solution, and filtering the product solution to remove a molten salt, followed by dispersion in 0.1-10% sulfuric acid solution at a temperature of 20 to 90° C., filtration, washing and drying, thereby obtaining an aluminum oxide crystal.

Advantageous Effects

The flaky aluminum oxide according to the present invention comprises a specific amount of zirconium oxide which makes it easy to control the thickness and size of the aluminum oxide particles so as to maintain a specific aspect ratio. Thus, the flaky aluminum oxide is suitable for use as a substrate for a pearlescent pigment. In addition, according to the present invention, a flaky alpha-alumina crystal can be obtained, which has a uniform particle size distribution and excellent dispersion properties compared to an aluminum oxide substrate containing titanium dioxide, zinc oxide or tin oxide. Furthermore, the flaky aluminum oxide according to the present invention has a significantly narrow particle size distribution at the same average particle size, and thus has increased pearlescent luster. When the flaky aluminum oxide is used as a raw material for a cosmetic material or the like, it will improve the adhesion and spreadability of the cosmetic product to the skin.

In a process for preparing the flaky aluminum oxide, the effect of addition of zirconium oxide on improvement in the dispersion of aluminum oxide results in the effect of reducing the amount of flux that is added during hydrolysis. In other words, sodium sulfate and potassium sulfate are used in combination in conventional methods; however, according to the present invention, even when one of sodium sulfate and potassium sulfate is used alone, an aluminum oxide substrate having excellent dispersibility can be obtained.

DESCRIPTION OF DRAWINGS

The FIG. is a graph showing the results of testing the particle size distribution of a flaky aluminum oxide prepared in each of Example 2 and Comparative Examples.

MODE FOR INVENTION

The advantages and features of the present invention, and the way of attaining them, will become apparent with reference to the exemplary embodiments described below. However, the present invention is not limited to the exemplary embodiments disclosed below and can be embodied in a variety of different forms; rather, these embodiments are provided so that this disclosure will be thorough and complete, and will fully convey the scope of the present invention to those skilled in the art. The scope of the present invention will be defined by the appended claims.

Flaky Aluminum Oxide

The present invention relates to a novel flaky aluminum oxide comprising aluminum oxide and zirconium oxide as main components at a specific component ratio. In the flaky aluminum oxide according to the present invention, zirconium oxide is distributed on the crystal surface of aluminum to increase the uniformity of the particle thickness and to promote the growth of particles. In addition, the increased uniformity of the particle thickness indicates that the formation of aggregated particles is prevented. The flaky aluminum oxide has an average thickness of 0.1-1 µm, preferably 0.5 µm or less, an average particle diameter of 5-25 µm, preferably 15 µm or more, and an aspect ratio of 25-250, preferably 50 or more. Thus, the flaky aluminum oxide has excellent properties for use as a substrate for a pearlescent pigment and as a filler for ceramic materials.

Method for Preparing Flaky Aluminum Oxide

Hereinafter, a method for preparing the flaky aluminum oxide according to the present invention will be described in detail.

First, an aqueous aluminum precursor solution containing a water-soluble flux is mixed with an aqueous zirconium precursor solution to prepare an aqueous metal precursor solution.

The aluminum precursor is not particularly limited as long as it generally used in the art. Specifically, the aluminum precursor that is used in the present invention may be selected from among acid salts, halides and oxides of aluminum. More specifically, it may be selected from among aluminum sulfate, aluminum nitrate and aluminum chloride. Moreover, the zirconium precursor that is used in the present invention is not particularly limited as long as it is generally used in the art. Specifically, the zirconium precursor may be selected from among acid salts, halides and oxides of zirconium. More specifically, the zirconium precursor may be selected from among zirconium sulfate, zirconium nitrate and zirconium chloride. In the present invention, among the above-described precursors, aluminum sulfate is selected and used, which has a hydrolytic property and a chemical affinity for the flux and more easily forms a water-soluble salt so as to be easily separated from a flaky crystal in water after crystallization, and zirconium sulfate is selected and used, which has a chemical affinity for the aluminum sulfate and a better effect on a decrease in the thickness of the flaky crystal and prevention of aggregation. The zirconium sulfate oxidizes to zirconium oxide at a temperature of 300° C. or higher, and this zirconium oxide adheres to the crystal plane of flaky aluminum oxide during crystallization. For this reason, the growth of the (0001) plane having relatively high surface energy is inhibited, while the growth of planes having relatively low surface energy is promoted (epitaxial growth). Therefore, the growth in the thickness direction and the growth in the diameter direction are promoted, thus forming flaky alumina crystals having a relatively thin thickness and large size compared to those prepared by conventional methods.

Furthermore, flaky alumina crystals having various aspect ratios may be prepared, because the thickness and size of the zirconium oxide may be easily changed depending on the amount of zirconium oxide used.

Because the aluminum precursor and the zirconium precursor are used as aqueous solutions, they are preferably used at concentrations of 15-35% and 20-50%, respectively. If the concentrations of the precursors are out of the above-described ranges, problems will arise in that it is difficult to perform hydrolysis and drying and it is difficult to prevent aggregation of the flaky aluminum oxide and to control the size and aspect ratio of the flaky aluminum oxide. For this reason, the concentrations are preferably maintained in the above-described ranges.

The zirconium precursor is used in an amount of 0.01-5 parts by weight based on 100 parts by weight of the aluminum precursor. If the zirconium precursor is used in an amount of less than 0.01 parts by weight, it will be difficult to prevent aggregation of the flaky aluminum oxide crystal, and if the zirconium precursor is used in an amount of more than 5 parts by weight, zirconium oxide will act as an impurity during crystallization to promote heterogeneous nucleation, thereby producing a crystal having an excessively large thickness and a non-uniform particle size distribution, which is difficult to use as a flaky substrate. For these reasons, the amount of zirconium precursor used is preferably maintained in the above-described range.

In addition, the water-soluble flux serves to change a solid state, in which nucleation and nuclear growth are difficult, into a liquid state in which nucleation and nuclear growth are easy. The mechanisms of nucleation and nuclear growth in a molten salt are as follows. Solute molecules or atoms agglomerate to form seeds, followed by nucleation and nuclear growth by diffusion under the control of surface free energy and volume free energy.

The nucleation of the flaky alumina crystal is divided into typical homogeneous nucleation which is caused by the diffusion of atoms depending on the super-saturation of solution in a molten salt solution, and heterogeneous nucleation which occurs in a container containing a solution or on the surface of solids or impurities in the solution.

However, like most nucleations, the nucleation of flaky aluminum oxide is accomplished by heterogeneous nucleation.

Because the nucleation occurs on a solid surface such as a crucible surface or an impurity particle surface, the interfacial energy is much smaller than that for the homogeneous nucleation, and for this reason, the activation energy is reduced to facilitate the nucleation. In the case of the heterogeneous nucleation, the activation energy greatly varies depending on the wetting angle between a solution and a solid surface, and as the wetting angle decreases, the driving force required for the nucleation decreases, thus facilitating the nucleation. However, there is also a case in which nucleation is not easy even when the wetting angle is small. This is because chemical affinity or physical properties on the surface are more important than the wetting angle. Therefore, nucleation on the solid surface may be facilitated compared to that on a smooth surface, if there are fine pores or grooves on the solid surface or chemical affinity between the nucleation seed and the solid surface.

There are two types of heterogeneous nucleation. One is nucleation and growth on the crucible surface and impurity particle surface, and the other is growth in a certain direction, called "epitaxial growth".

The water-soluble flux is not particularly limited as long as it is generally used in the art. The water-soluble flux that is used in the present invention has a high chemical affinity for the aluminum precursor, easily forms a molten salt even at low temperatures, and is easily dissolved in water after crystallization. Specifically, the water-soluble flux that is used in the present invention may be selected from among, for example, sodium sulfate, potassium sulfate, potassium hydrogen sulfate, sodium borate, potassium nitrate and potassium hydroxide. If conventional Ti, Zn or Sn is added, sodium sulfate and potassium sulfate as molten salts for forming a flaky crystal should be added in combination. However, if Zr is added for synthesis, there is an advantage in that the distribution and dispersion of particles are facilitated, and thus fluxes that are used in combination in conventional methods may be used alone.

Next, the aqueous metal precursor solution is titrated to a pH of 6.0-7.5 with an aqueous sodium salt solution, and then hydrolyzed, thereby preparing a mixed gel.

The aqueous sodium salt solution is not particularly limited as long as it is generally used in the art. Specifically, the aqueous sodium salt solution that is used in the present invention may be one or more selected from among, for example, sodium carbonate, sodium bicarbonate, sodium hydroxide, and sodium phosphate.

Next, the prepared mixed gel is aged and dried to make dry powder. Herein, the aging is performed at a temperature of 60 to 100° C. for 5-30 hours. If the aging temperature is lower than 60° C., the growth of pseudo-boehmite contained in the mixed gel will be difficult, and if the aging temperature is higher than 100° C., the morphological change of pseudo-boehmite will be caused by a hydrothermal reaction, and the formation of flaky crystals will be difficult. If the aging time is less than 5 hours, a homogeneous mixed gel may not be obtained, and the growth of pseudo-boehmite will be difficult, causing serious aggregation of flaky alpha-alumina crystals. If the aging time is more than 30 hours, a flaky aluminum oxide crystal having a large thickness due to excessive growth of pseudo-boehmite will be obtained.

Nucleation and growth of pseudo-boehmite and uniform dispersion of the mixed gel may be achieved by performing the above-described mixing, hydrolysis and aging processes. These processes facilitate the formation of flaky crystals caused by the aggregation of needle-shaped gamma-alumina during the crystallization, and also distribute zirconium oxide on the surface of flaky aluminum oxide crystals, thereby causing the decrease in thickness and promoting the growth of particles while preventing the aggregation of particles.

Next, the pretreated dry powder is calcined. Herein, the calcination is performed at a temperature of 300 to 700° C. for 1-5 hours. If the calcination temperature is lower than 300° C., complete removal of crystal water will be impossible, and if the calcination temperature is higher than 700° C., removal of crystal water will overlap with the formation of flaky crystals caused by aggregation of pseudo-boehmite, thus forming non-uniform flaky crystals.

In the calcination process, water is sufficiently removed by removal of crystal water, thereby preventing the catalytic activity of water during crystallization.

Next, the calcined powder is crystallized. Herein, the crystallization is performed at a temperature of 1,000 to 1,400° C. for 1-7 hours. If the crystallization temperature is lower than 1,000° C., it will be impossible to prepare flaky aluminum oxide, and if the crystallization temperature is higher than 1,400° C., sulfur (S) of the flux will be separated to make it difficult to maintain the molten salt, resulting in aggregation of flaky crystals, while energy consumption will increase to increase the production cost.

In the crystallization process, a uniform concentration of a molten salt is formed at a uniform temperature without a temperature gradient, so that flaky crystals having a sufficient size are formed by the aggregation of needle-shaped particles before the phase transition to aluminum oxide occurs.

The crystallized product is subjected to cooling, washing and drying processes which are used in the art. In the present invention, the crystallized product is cooled to room temperature, dissolved in water at a temperature of 20 to 90° C., and then filtered, and the resulting material is dispersed in 0.1-10% sulfuric acid solution at a temperature of 20 to 90° C. The dispersion is filtered, washed and dried, thereby obtaining flaky aluminum oxide. If the concentration of the sulfuric acid solution is lower than 0.1%, the dispersion of the flaky aluminum oxide will be difficult, and if the concentration of the sulfuric acid solution is higher than 30%, the dispersing effect will level off while the cost for discharging waste solution will increase. For these reasons, the concentration of the sulfuric acid solution is preferably maintained in the above-described range.

The flaky aluminum oxide prepared by the above-described process, which comprises aluminum oxide and zirconium oxide as main components at a specific component ratio, has an average thickness of 0.5 μm or less, an average particle diameter of 15 μm or more, and an aspect ratio of 50 or more. Thus, the flaky aluminum oxide has excellent properties for use as a substrate for high-quality pearlescent pigments and as a filler for ceramic materials.

Pearlescent Pigment and Preparation Method Thereof

Hereinafter, a pearlescent pigment comprising the flaky aluminum oxide prepared as described above according to the present invention and a method for preparing the pearlescent pigment will be described in detail.

A pearlescent pigment according to the present invention comprises, as a substrate, a flaky aluminum oxide comprising a certain amount of zirconium, in which the flaky aluminum oxide is coated with metal or metal precursor particles. The pearlescent pigment can show silver, gold, red, purple, blue or green interference colors or metal colors.

The metal or metal precursor may be selected from among gold, silver, copper, titanium, tin, manganese, nickel, silica and iron metals, and acid salts, halides and oxides of these metals. Specifically, the metal or metal precursor may be one or a mixture of two or more selected from among gold (I) chloride, gold (II) chloride, silver chloride, silver nitrate, copper sulfate, copper nitrate, copper chloride, titanium sulfate, titanium nitrate, titanium chloride, tin sulfate, tin nitrate, tin chloride, manganese chloride, manganese sulfate, nickel chloride, nickel sulfate, silica compounds, iron sulfate, iron nitrate, and iron chloride.

The pearlescent pigment according to the present invention is prepared by: adding an acid to an aqueous solution containing the above-described flaky aluminum oxide suspended therein to adjust the pH of the aqueous solution to a pH of 1.0-3.0; adding a metal or metal precursor and an alkali metal hydroxide to the pH-adjusted aqueous solution, followed by stirring; and filtering, washing, drying and calcining the stirred solution, thereby forming a metal or metal oxide coating layer on the surface of the flaky crystal.

In the method for preparing the pearlescent pigment, the range of pH is maintained in order to facilitate efficient hydrolysis of the metal or metal precursor to be coated. If the pH is less than 1.0, it will be difficult to coat the metal or metal precursor on the alpha-alumina particles, and if the pH is more than 3.0, excessive aggregation of the metal precursor will occur. For these reason, the pH is preferably maintained in the above-described range.

As mentioned above, the metal or metal precursor may be selected from among gold, silver, copper, titanium, tin, manganese, nickel, silica and iron metals, and acid salts, halides and oxides of these metals. Specifically, the metal or metal precursor may be one or a mixture of two or more selected from among gold (I) chloride, gold (II) chloride, silver chloride, silver nitrate, copper sulfate, copper nitrate, copper chloride, titanium sulfate, titanium nitrate, titanium chloride, tin sulfate, tin nitrate, tin chloride, manganese chloride, manganese sulfate, nickel chloride, nickel sulfate, silica compounds, iron sulfate, iron nitrate, and iron chloride.

This metal or metal precursor is used in an amount of 20-60 parts by weight based on 100 parts by weight of the flaky aluminum oxide. If the metal or metal precursor is used in an amount of less than 20 parts by weight, the pearlescent pigment will not have high pearlescent luster and an interference color, and if metal or metal precursor is used in an amount of more than 60 parts by weight, problems will arise in that the pearlescent luster decreases and a turbid interference color occurs. For these reasons, the amount of metal or metal precursor used is preferably maintained in the above-described range.

Furthermore, the alkaline aqueous solution that is added simultaneously with the metal or metal precursor is used so that the metal or metal precursor is effectively coated on the flaky alumina particles. Specifically, the alkaline aqueous solution may comprise sodium hydroxide, potassium hydroxide or ammonia. This alkaline aqueous solution is used in an amount of 20-65 parts by weight based on 100 parts by weight of the alpha-alumina crystal. If the alkaline aqueous solution is used in an amount of less than 20 parts by weight, coating with the metal or metal precursor will be slow, and if the alkaline aqueous solution is used in an amount of more than 65 parts by weight, hydrolysis will be accelerated to cause excessive aggregation. For these reasons, the amount of alkaline aqueous solution used is preferably maintained in the above-described range.

In the method for preparing the pearlescent pigment, the calcination is performed at a temperature of 700 to 1,000° C. for 30-60 minutes. If the calcination temperature is lower than 700° C., formation of the metal oxide will be difficult, and if the calcination temperature is higher than 1,000° C., cracking of the metal oxide surface will be caused by the excessively high temperature, resulting in a decrease in the quality of the pearlescent pigment. For these reasons, the calcination temperature is preferably maintained in the above-described range.

The prepared pearlescent pigment shows various colors, including silver, gold, red, purple, blue and green interference colors and a red metallic color, depending on the amounts of metal or metal precursor and alkaline hydroxide added, and has excellent pearlescent luster.

In addition, using the flaky aluminum oxide of the present invention as a substrate, a pearlescent pigment and a pearlescent pigment for exterior use having improved weather resistance can be prepared by coating a metal oxide layer on the substrate and forming multiple oxide layers comprising $SiO_2$ on the metal oxide layer.

More specifically, when cerium, zirconium, zinc, silicon and aluminum layers are formed on the prepared pearlescent pigment and coated with a silane coupling agent, the pearlescent pigment will have excellent external moisture resistance and weather resistance compared to conventional pearlescent pigments.

The pearlescent pigment according to the present invention as described above may be used in applications, including industrial coating, varnish, automotive coating, powder coating, printing ink, and cosmetics.

Hereinafter, the present invention will be described in further detail with reference to examples. However, the scope of the present invention is limited by these examples.

EXAMPLE 1

1,900 mL of deionized water was placed in a 5-L reactor, and 652 g of aluminum sulfate octadecahydrate, 350 g of sodium sulfate and 4.3 g of 35% zirconium sulfate were added thereto, followed by mixing at 65° C., thereby preparing a homogeneous mixture solution. An alkaline solution was prepared by dissolving 297 g of sodium carbonate and 2.7 g of sodium phosphate in 900 mL of deionized water at a temperature of 65° C. At 65° C., the mixture solution containing aluminum sulfate is titrated with the alkaline solution with stirring and adjusted to a final pH of 6.8, thereby preparing a mixed gel of pseudo-boehmite and flux. Next, the mixed gel was aged at a temperature of 90° C. for 20 hours, and then distilled in a vacuum at a temperature of 60° C. and dried at a temperature of 110° C. for 20 hours.

The dried material was ground to a size of about 5 mm or less, and then placed in a crucible and calcined at 500° C. for 1 hour to sufficiently remove water separated as crystal water. Thereafter, the calcined material was heated to 930° C. and maintained at that temperature for 30 minutes, thereby facilitating the production of a homogeneous molten salt and the production of flakes by aggregation of needle-shaped gamma-alumina particles. Next, the calcined material was crystallized at 1,150° C. for 5 hours and 30 minutes, thereby preparing a flaky aluminum oxide crystal. The crucible was cooled to room temperature, and the molten salt was dissolved in hot water at 60° C., followed by filtration to separate the flaky aluminum oxide crystal.

The separated flaky aluminum oxide crystal was placed in a reactor together with 0.5% sulfuric acid solution, and stirred at a temperature of 60° C. to enable complete dispersion of the crystal particles. The dispersion was filtered, washed, and dried at 100° C. The results of observation with an electron microscope indicated that flaky aluminum oxide particles having a thickness of 0.1-0.3 μm and an average particle size of 15.3 μm were obtained. The results of elemental analysis indicated that the flaky aluminum oxide particles contain zirconium oxide.

EXAMPLE 2

A transparent flaky alumina crystal was obtained in the same manner as described in Example 1, except that 8.5 g of 35% zirconium sulfate was used.

EXAMPLE 3

A transparent flaky alumina crystal was obtained in the same manner as described in Example 1, except that 13.3 g of 35% zirconium sulfate was used.

EXAMPLE 4

A transparent flaky alumina crystal was obtained in the same manner as described in Example 1, except that 18 g of 35% zirconium sulfate was used.

Test

1. Test for Average Particle Thickness and Average Particle Size of Flaky Aluminum Oxide The thickness, average particle size and aspect ratio of the flaky aluminum oxide particles prepared in the Examples are as follows.

TABLE 1

|  | Amount (g) of zirconium sulfate used | Average particle thickness (μm) | Average particle size (μm) |
|---|---|---|---|
| Example 1 | 4.3 | 0.25 | 15.3 |
| Example 2 | 8.5 | 0.45 | 17.2 |
| Example 3 | 13.3 | 0.75 | 19 |
| Example 4 | 18 | 0.8 | 22 |

The flaky aluminum oxide prepared in Example 1 was observed with an electron microscope, and as a result, it was found that transparent flaky aluminum oxide particles having a thickness of 0.1-0.3 μm and an average particle size of 15.3 μm were obtained. Elemental analysis indicated that flaky aluminum oxide containing zirconium oxide was prepared in Example 1. The aluminum oxide crystal prepared in Example 2 had a thickness of 0.4-0.5 μm and an average particle size of 17 μm, and the results of elemental analysis indicated that the aluminum oxide crystal prepared in Example 2 contained zirconium oxide. In addition, the aluminum oxide crystal prepared in Example 3 had a thickness of 0.7-0.8 μm and an average particle size of 19 μm, and the results of elemental analysis indicated that the aluminum oxide crystal prepared in Example 3 contained zirconium oxide. Furthermore, the aluminum oxide crystal prepared in Example 4 had a thickness of 0.7-0.9 μm and an average particle size of 22 μm, and the results of elemental analysis indicated that the aluminum oxide crystal prepared in Example 4 contained zirconium oxide.

It can be seen that the flaky aluminum oxide crystals prepared in the Examples of the present invention, which comprise zirconium oxide, all satisfy an average particle size of 0.1-1 μm and an average particle size of 15-25 μm.

2. Particle Size Distribution Test

The particle size distribution of each of the flaky aluminum oxide (Example 2) according to the present invention, and the flaky aluminum oxide crystals prepared in Comparative Examples 1 to 3 without using zirconium sulfate, was tested.

The flaky aluminum oxide crystals of Comparative Examples 1 to 3 were prepared as follows.

COMPARATIVE EXAMPLE 1

The flaky aluminum oxide of Comparative Example 1 was prepared in the same manner as described in Example 1, except that 4.3 g of titanium sulfate was used instead of 4.3 g of 35% zirconium sulfate.

COMPARATIVE EXAMPLE 2

The flaky aluminum oxide of Comparative Example 2 was prepared in the same manner as described in Example 1, except that 5 g of zinc sulfate heptahydrate was used instead of 4.3 g of 35% zirconium sulfate.

COMPARATIVE EXAMPLE 3

The flaky aluminum oxide of Comparative Example 1 was prepared in the same manner as described in Example 1, except that 2.04 g of tin sulfate was used instead of 4.3 g of 35% zirconium sulfate.

The particle size distribution of the flaky aluminum oxide was measured using a particle size analyzer (Master Sizer 2000, Malvern Instrument). The results of the measurement are graphically shown in FIG. 1, and the particle diameter and particle size distribution of the flaky aluminum oxide prepared in each of the Examples and the Comparative Examples are summarized in Table 2 below.

TABLE 2

|  | Particle diameter | | | | |
|---|---|---|---|---|---|
|  | D10 (μm) | D50 (μm) | D90 (μm) | Particle size distribution | Dispersion |
| Example 2 | 7.31 | 17.20 | 34.35 | Good particle size distribution | Good |
| Comparative Example 1 | 6.11 | 18.41 | 37.56 | The average particle size is small, and particularly, a large amount of small particles are present. | A large number of small particles were aggregated. |
| Comparative Example 2 | 7.13 | 19.96 | 36.60 | A large amount of large particles are present. | Relatively good |
| Comparative Example 3 | 5.71 | 18.00 | 38.32 | A large amount of large and small particles are present, and thus the particle size distribution is broad. | A large amount of twin crystals are present, indicating poor dispersion. |

In Table 2, D10, D50 and D90 means the particle diameters corresponding to 10%, 50% (average particle diameter) and 90% of the cumulative distribution.

Herein, D50 means the median particle diameter. Referring to Table 2 above, it can be seen that Example 2 had the smallest average particle diameter and Comparative Example 2 had the largest average particle diameter.

In addition, it can be considered that the smaller the D10, the finer the particles and that the larger the D90, the larger the particles.

Referring to Table 2 comparing Example 2 with the Comparative Examples, it can be seen that the flaky aluminum oxide prepared in Example 2 comprises zirconium sulfate, and thus the particle size distribution thereof is very narrow and good compared to those of the Comparative Examples. Thus, when a pearlescent pigment is prepared using the flaky aluminum oxide of Example 2 as a substrate, the pearlescent luster of the pigment particles will increase, and when the flaky aluminum oxide of Example 2 is used as a raw material for a cosmetic product, the adhesion and spreadability of the cosmetic product will be improved.

In comparison with this, the flaky aluminum oxide of Comparative Example 1, prepared using titanium sulfate, has a broad particle size distribution and comprises a large amount of small particles, and thus is liable to aggregate. When a pearlescent pigment is prepared using the flaky aluminum oxide of Comparative Example 1 as a substrate, there will be a problem in that a pigment having a turbid color due to particle aggregation is obtained.

In addition, it can be seen that the flaky aluminum oxide of Comparative Example 2, prepared using zinc sulfate, comprises a larger amount of large-sized particles compared to that of Example 2. When a pearlescent pigment is prepared using the flaky aluminum oxide of Comparative Example 2 as a substrate, there will be a problem in that a pigment having a rough feeling and insufficient hiding power due to a large amount of large particles is obtained.

Furthermore, the flaky aluminum oxide of Comparative Example 3, prepared using tin sulfate, comprises a large amount of large and small particles, and thus has a very broad particle size distribution.

When a pearlescent pigment is prepared using the flaky aluminum oxide of Comparative Example 3 as a substrate, there will be a problem in that a pigment having low pearlescent luster and a turbid color due to a large amount of twin crystals is obtained.

The invention claimed is:

1. A method for preparing flaky aluminum oxide, comprising the steps of:
   preparing an aqueous metal precursor solution consisting essentially of an aluminum precursor, a zirconium precursor, a water-soluble flux, and water,
      wherein the zirconium precursor is present in an amount of 0.01-5 parts by weight based on 100 parts by weight of the aluminum precursor;
   titrating the aqueous metal precursor solution to a pH of 6.0-7.5 with an aqueous sodium salt solution, followed by hydrolysis, thereby preparing a mixed gel;
   aging the mixed gel at a temperature of 60 to 100° C. for 5-30 hours, followed by drying to prepare dry powder;
   calcining the dry powder at a temperature of 300 to 700° C. for 1-5 hours;
   crystallizing the calcined powder at a temperature of 1,000 to 1,400° C. and 1-7 hours, thereby preparing a crystallized product; and
   cooling a mixture of the crystallized powder and a molten salt to room temperature, dissolving the cooled mixture in water at a temperature of 20 to 90° C., and filtering the dissolved mixture to remove the molten salt, followed by dispersion in 0.1-10% sulfuric acid solution at a temperature of 20 to 90° C., filtration, washing and drying, thereby obtaining an aluminum oxide crystal.

2. The method of claim 1, wherein the aluminum precursor is selected from among acid salts, halides or oxides of aluminum.

3. The method of claim 1, wherein the zirconium precursor is selected from among acid salts, halides or oxides of zirconium.

4. The method of claim 1, wherein the water-soluble flux is selected from among sodium sulfate, potassium sulfate, potassium hydrogen sulfate, sodium borate, potassium nitrate, or potassium hydroxide.

5. The method of claim 1, wherein the sodium salt is one or more selected from among sodium carbonate, sodium bicarbonate, sodium hydroxide, or sodium phosphate.

6. A method of preparing flaky aluminum oxide, comprising:
   preparing an aqueous metal precursor solution consisting essentially of an aluminum precursor, a zirconium precursor, a water-soluble flux, and water;
   adjusting a pH of the aqueous metal precursor solution, followed by hydrolysis to form a mixed gel;
   aging the mixed gel;
   drying the aged mixed gel to prepare a dry powder;
   calcining the dry powder;
   subjecting the calcined dry powder to an elevated temperature to form a crystallized product,
      wherein the crystallized product comprises an alpha aluminum oxide, and a molten salt of the water-soluble flux;
   cooling the crystallized product;
   dissolving the crystallized product in water, followed by filtering to remove the molten salt from the alpha aluminum oxide; and
   dispersing the alpha aluminum oxide to obtain the flaky aluminum oxide.

7. The method of claim 6, wherein the aluminum precursor comprises an aluminum acid salt, an aluminum halide, an aluminum oxide, or combinations thereof.

8. The method of claim 6, wherein the zirconium precursor comprises a zirconium acid salt, a zirconium halide, a zirconium oxide, or combinations thereof.

9. The method of claim 6, wherein the water-soluble flux comprises sodium sulfate, potassium sulfate, potassium hydrogen sulfate, sodium borate, potassium nitrate, potassium hydroxide, or combinations thereof.

10. The method of claim 6, wherein the zirconium precursor is present in an amount of 0.01 part by weight to 5 parts by weight based on 100 parts by weight of the aluminum precursor.

11. The method of claim 6, wherein adjusting the pH of the aqueous metal precursor solution comprises adjusting the pH of the aqueous metal precursor solution to a range of 6.0 to 7.5.

12. The method of claim 6, wherein aging the mixed gel comprises subjecting the mixed gel to a temperature range of 60 to 100° C. for 5-30 hours.

13. The method of claim 6, wherein calcining the dry powder comprises subjecting the dry powder to a temperature range of 300 to 700° C. for 1-5 hours.

14. The method of claim 6, wherein subjecting the calcined dry powder to the elevated temperature to form the crystallized product comprises subjecting the calcined dry powder to a temperature range of 1,000 to 1,400° C. and 1-7 hours.

15. The method of claim 6, wherein dispersing the alpha aluminum oxide comprises dispersing the alpha aluminum oxide in 0.1-10% sulfuric acid solution at a temperature range of 20 to 90° C.

16. The method of claim 6, wherein the aluminum precursor is aluminum sulfate.

17. The method of claim 6, wherein the zirconium precursor is zirconium sulfate, zirconium nitrate, zirconium chloride, or combinations thereof.

* * * * *